Nov. 6, 1934.  E. J. OVINGTON  1,980,081
BEARING
Filed July 5, 1928

Inventor
Edward J. Ovington
by Mitchell, Chadwick + Kent
Attorneys

Patented Nov. 6, 1934

1,980,081

UNITED STATES PATENT OFFICE 1,980,081

BEARING

Edward J. Ovington, Auburndale, Mass., assignor of one-half to Chester L. Dawes, Cambridge, Mass.

Application July 5, 1928, Serial No. 290,372

4 Claims. (Cl. 308—238)

This invention relates to improvements in bearings. More particularly it provides for a bearing in which both bearing surfaces may be of materials that are very hard and therefore durable by nature, and in which one of them, preferably vitreous, is so mounted as to be durable under the shocks and other incidents of handling and operation even though it is also by nature brittle and rather easily frangible.

Industrial processes have made glass and porcelain easy to obtain, but the inherent brittleness of these substances has prevented their being much used for bearings. The invention removes this objection to a great extent.

The bearing of the invention is adapted for high speed as well as for low, and in suitable cases may run without lubrication, that is with no lubricant but air, or whatever other fluid may incidentally be entrained. This last is of value where the introduction of an oily lubricant would be objectionable, for example, in a certain type of drink mixer to which the present invention has been successfully applied, or in the mixing, emulsifying or whirling of other food substances. The ability to dispense with oil is also useful in places where the lubricating is liable to be neglected by the user as in small electric motors used for various purposes; or where lubricating is difficult, as in speedometer shafts, which must run constantly under more or less pounding, or in tower clock bushings where a slight difference in friction may make a considerable difference in the accuracy of operation. Also it is useful in other cases, as in the said drink mixer, where any oil that is furnished to the bearing is liable to be drawn rapidly away from the bearing by adjacent whirling liquid or other action. In general it approaches the function of the jewelled bearing in diminishing friction, and makes it possible to put a bearing of comparable efficiency into larger installations where jewels would be impossible because of expense or for other reasons.

For application to the utility first mentioned, and as illustrated herein, the bearing is between a rotating vertical chromium-plated shaft and a vitreous cylinder, operating without added lubricant, but having the qualities of low friction and high durability and of such close fit as, without the use of packing, prevents liquid upon which the mixer is operating from passing through the bearing. The avoidance of the use of packing is advantageous because packing would apply undesirable drag to the rotation of the shaft.

It has heretofore been desired to make bearing surfaces extremely hard, for example, of chromium; but as two surfaces of similar material do not slip well on each other intermittent areas of soft material have been necessary, in one of the two, or even definite spaces, as grooves, affording passages and holding means for lubrication. The present invention makes it possible to use a simple diversity of two hard materials, one for the whole of each of the rubbing surfaces.

The durability of the glass bearing surface is attained by setting up certain internal stresses in the glass body. These result from pressures applied to it exteriorly from all directions. And these pressures in turn are applied by surrounding the glass body with a stretched, elastic solid which substantially covers all of the surfaces of the glass except the bearing surface, and whose contractile effort is maintained continuously, in matter of time, and continuously in matter of area, with that intimacy and universality or continuity of contact which characterizes the contact of a liquid pressing against a solid. This result arises because of its having been formerly a fluid exerting a constrictive pressure upon the glass, which fluid became converted into a solid while retaining or even increasing its constrictive pressure elastically.

Specifically this may be accomplished by molding a phenolic condensation product such as bakelite about the sides and both ends of the glass cylinder, the bore of the cylinder being duly filled with an arbor. The "Bakelite" molding and converting process is carried forward in the usual way under heat and pressure. The powder initially introduced receives heat gradually by contact from without; and this powder in turn applies heat gradually to the glass and so raises the temperature of the glass at a safe rate, without internal stresses liable to break the glass, while the "Bakelite" becomes liquid and then is transformed or condensed into a solid. As soon as it becomes liquid the "Bakelite" makes fluid contact pressing on every bit of the surface of the glass except that which is to be the bearing surface; and when it solidifies it does so with constrictive effect while maintaining such contact, and at the same time it acquires those qualities of strength and resilience which characterize hard "Bakelite."

Thus jacketed, the brittleness of the glass has no opportunity to assert itself, because this can be manifest only with the formation of a crack, and a crack cannot occur in a super-cooled liquid as glass without a physical separation of the material at the crack, which in turn cannot occur in the present instance because of the compressive and constrictive forces which are imposed by the "Bakelite" jacket.

On the other hand, by contrast, if the "Bakelite" were merely fitted to the glass as one solid machined to fit another, however accurately the task might be performed, the fit would be only contacts of a relatively few high spots on the glass with equally few spots on the jacket; and shocks would be transmitted through these points with stresses concentrated to an intensity which might be sufficient for fracture of the brittle point. Likewise if inequality of support resulted, from a failure to make the constrictive jacket cover all parts of the glass body (except its bearing surface).

In the above described structure of the invention the bearing surface is a concave cylinder, which makes a further protection, for if any fracture were to occur the fragments produced thereby could not move out of position. The constriction of the particles together, by stresses transmitted internally of the glass; the high friction between themselves, naturally high and augmented by their high pressure together; and the fact that toward the axis the space for containing them is even less, all co-act to hold the bearing surface intact.

Thus the invention provides a bearing for the rotation of a shaft at high or low speed, without liquid lubrication if desired, and without appreciable abrasion, and therefore with very great durability. The absence of liquid lubrication applies especially where the bearing pressure is not so great as to pinch out the air which is or would be drawn in.

It is intended that the patent shall cover by suitable expression in the appended claims whatever features of patentable novelty exist in the invention disclosed.

The accompanying drawing illustrates an embodiment of the invention as it may be applied for the bearing of a rotating shaft, but it will be understood that many advantages may be realized even in cases where the bearing surface is not cylindrical; also where a lubricant having greater body than air is introduced.

In the accompanying drawing, which is more or less diagrammatical:

Figures 1, 2:
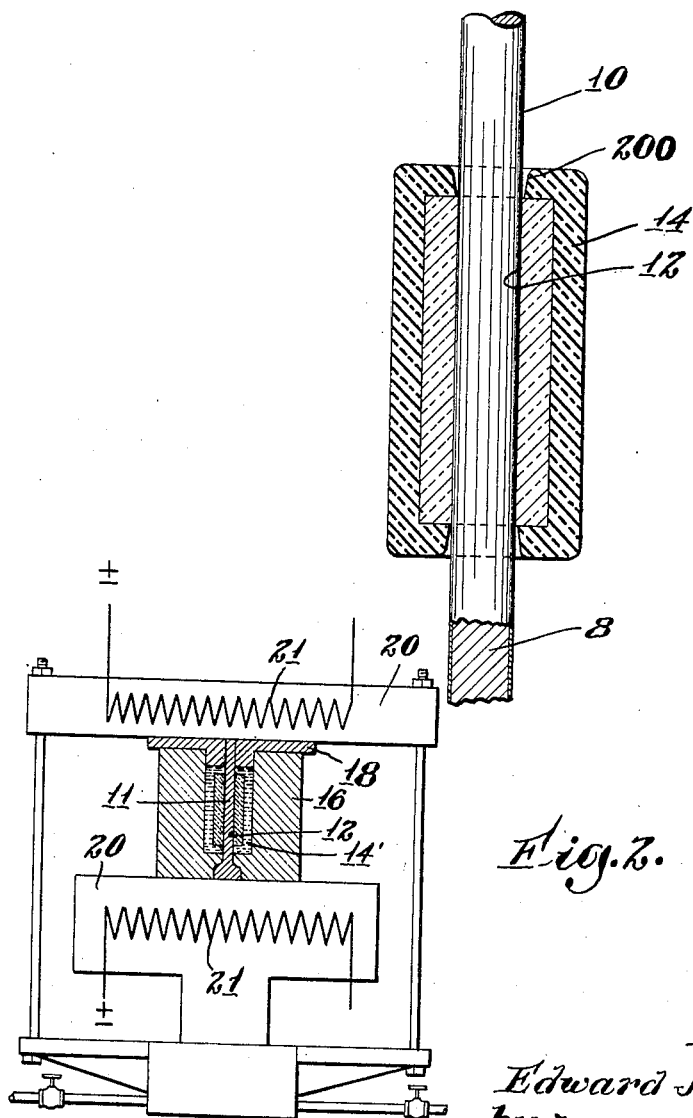
Figure 1 is a medial longitudinal section through the bearing.
Figure 2 is a diagram of the mold and materials at one step in the making of the bushing.

The convex bearing surface 10 of the shaft is of a tenacious material which is very hard, with high finish, and is illustrated as being the surface of a shell of chromium, plated as seen at the ends over the cylindrical exterior of a shaft of steel 8 or other metal which is accurately workable because not so hard and which serves the purpose of supporting the thin body of chromium with the hard bearing surface in the precise dimension desired.

The concave bearing surface 12 of the bushing is conveniently made on a body of glass, being ground to an accurate internal diameter. If the bearing is to run without lubrication except by the air or other material which may incidentally enter, the clearance between bearing surfaces should be made very small; and where the shaft is of the order of five-sixteenths of an inch of diameter the clearance may be of the order of two ten-thousandths of an inch difference of diameter. If a lubricating liquid is to be introduced between the bearing surfaces this clearance may be larger.

Great efficiency is attained by having one of the contacting surfaces as smooth as possible, e. g. the chromium, and the other not quite so smooth. The higher degree of smoothness is attained in this instance by making the steel with high finish or "color", and its high finish will be sufficiently reproduced in the chromium plated upon it without need for polishing the chromium. For the glass bushing, a section of drawn glass tubing may be used in which the natural fire glazed surface of the interior of the tube has been made slightly rough by a grinding and polishing operation, as with a diamond boring tool, or preferably by lapping it out by an abrasive on a mandrel. Such a polishing of the glass leaves its surface very smooth but not equal to the surface of the shaft in this quality. In such a polished surface the minute peaks or points which would first make contact with the other bearing surface are as close together as possible and yet there are interstices between them large enough to store the lubricant, whether this be gaseous, liquid or solid, so that if any pounding of the bearing occurs, there are in the first place a great multiplicity of firm contact points of the glass among which the stress is divided, and in the second place each of these is intimately surrounded by lubricant which constantly rolls over it. This makes a bearing superior to that which would exist between two equally smooth surfaces, for between such the lubricant air, liquid or semi-solid would not have so good opportunity always to intervene.

Other materials than those named might be chosen, but these illustrate an embodiment of the invention with materials which are at the present conveniently available. And while the plating of a brass or steel shaft with chromium makes its surface desirably harder it is obvious that for some purposes the plating can be omitted and that the hard surface of the steel alone, for example, will suffice. The more important aspect of the invention has to do with the discovery how to utilize vitreous materials, which are hard and can be made very smooth, but whose brittleness is an important detriment when bearings are subject to pounding stresses.

The invention utilizes the fact that no flow, disintegration or change of shape of the bearing surface of glass can occur without a fracture; and that no fracture can occur without there being a space into which the fragment can move from its original location. The invention provides that no such space shall exist. It does this by producing continuous internal stresses constricting every interior portions of the glass severely against its respective neighboring portions. No fragment can move toward the axial hollow, on account of cohesion of the material, and because each lateral neighboring portion of the material resists such movement, which would make the constriction at the bearing surface even more severe. It is thus held against fracture, and against movement even if it were fractured. For in that case the opposition would still remain, both by sharp friction against lateral fragments, and by that resistance which inhibits its movement into the adjacent open bore, which is a yet smaller space, because nearer the axis, upon a principle similar to that which holds up the loose stones of an arch.

The said internal stresses result from stresses applied exteriorly by a tight, resilient jacket 14 which, under tension, encloses both the periphery and the ends of the bushing, and thus actively constricts the whole body of glass elastically toward the cylindrical bearing surface 12, by forces acting from all remaining points of the surface of the glass body.

Figure 2 shows a step in the making of this jacket. The glass, having been prepared with its polished hollow cylindrical bearing surface, is seen in the mold 16 strung on a pin or arbor 11 which is identical in size with the finished shaft 10 but which is shaped and fitted to be a part of the mold as illustrated. The mold has a cover 18 which fits into the body 16, the two being compressed between platens 20 of a press which are heated as indicated conventionally by 21. "Bakelite" powder having been put into the mold with the bushing, and arranged so that in the finished product some of the "Bakelite" will be under the glass body, and some over it, it being desirable that the glass shall be enclosed on all sides, the cover 18 is put on; and heat and pressure are applied compressing the powder and glass in the mold as is customary for executing the "Bakelite" molding process.

During the process the powder becomes a liquid, at a temperature far below any temperature which would seriously affect the glass, and then the entire "Bakelite" contents are fluid and under pressure, which is the stage indicated in Figure 2; later becoming a solid. The pressure on the glass is presumably increased as the "Bakelite" material passes to solid state; and the state of compression of the glass becomes permanent by the solidification of the "Bakelite" while expanded to the full capacity of its space and thereby pressing strongly on the glass from all directions, and at the same time pressing elastically according to its nature.

The forming of the condensation product of phenol and formaldehyde in proximity to the glass means that this material is applied to the glass at ordinary temperature and that it passes from loose solid to liquid state at a moderate temperature, and so slowly that the temperature change can be made to pervade the glass body gradually, and then returns from liquid to solid state while the glass is at its own temperature, after which both cool together, so that the internal stresses of both the bushing and its jacket are made uniform and safe.

To obtain this fluid contact, at a moderate temperature under an applied pressure which subsequently becomes the permanent constrictive resilient pressure of a solid, "Bakelite" is an example of a substance which can be used, and other examples are found in those other substances, of organic origin, whose behavior is similar to that of "Bakelite".

Upon cooling, the constrictive effect of the now solid and integral "Bakelite" is applied to all exterior surfaces of the glass directly and intimately, with the same perfection of covering of each element of area that is characteristic of a liquid contact; and the constrictive effect is applied indirectly through the glass itself to all of the glass that is immediately adjacent to and supporting the bearing surface. Upon removal of the arbor the "Bakelite" which was pinching it at the ends of the bearing may be chamfered away slightly as at 200; to provide clearance for the shaft although leaving the glass entirely covered at the end of the bearing.

Upon the insertion of the shaft subsequently, a thin film of air fills the space between the glass 12 and the chromium 10; and this serves as a lubricant, preventing direct contact of the chromium with the glass, if the pressure of the shaft is not so heavy as to pinch out this film of air. But whenever direct contact of chromium with glass occurs, the hardness of each prevents any flow of the material, such as may happen where the usual bearing alloys are employed; and the constrictive holding of the jacket, with the internal stresses described, prevents any fracture or movement of fragments of the glass if any such fragments occur. The said clearance, suggested, is so small as to prevent the flowing through of any liquid that may be outside and adjacent. If the clearance be made greater, and a lubricant be introduced, as oil, the invention still has important advantages.

The prescribed high degree of hardness, indicated by the hardness of materials suggested in naming chromium and glass or vitreous porcelain, gives a resistance of the bearing surfaces to abrasion, indentation, and cold flow, as distinguished from the ordinary bearing alloys. The making of the jacket of organic condensation solid material provides contact of the jacket at all points, and not merely at the high points of the respective abutting surfaces, and so reduces the intensity of the applied constrictive pressure to a safe figure by distributing it over a greater area; and this in turn results from the fact that when the jacket first becomes an integral mass it is a fluid in which the enclosure consisting of the glass bushing is immersed.

In the best form of the invention it is not necessary to incorporate grooves in either bearing surface for holding or distributing either a lubricant or a hot or cold flow bearing material.

The shape and size of the steel or brass shaft having been perfected and highly polished, this convex surface can be plated uniformly with chromium which will retain on its surface the high polish of the underlying steel surface. The bushing can be finely ground to exact size, and the slight roughness inevitably then present allows space for air to be adsorbed, and decreases the actual area of surface contact while maintaining a desired over-all length of bearing. Running thus with an extremely thin air cushion between the bearing surfaces, one end of the bearing can be exposed in a receptacle for liquid, for example, for mixing drinks, or for separating cream, or beating eggs or mayonnaise or emulsifying substances, the space between the bearing surfaces being too thin for the particular liquid to pass through, and at the same time maintaining such a true axial alignment of the shaft within the bushing that the pounding effect of the shaft upon the brittle material of the bushing is so small as to do no damage.

I claim as my invention:

1. A bearing comprising a shaft having a surface of hard, tenacious metal and a cooperating support having a surface of hard, brittle material; the said support having, combined with the brittle material, a tough, resilient, enclosing jacket holding the brittle material intimately under compressive stress from all directions except from its bearing surface.

2. A bearing, wherein the bodies bearing together have surfaces respectively of a hard tenacious metal and of a hard material which is brittle, said brittle material being engaged with intimate binding compression, on all surfaces except the bearing surface, by a solid, organic condensation product of the type which has the characteristic that under heat and pressure it passes from an initial loose solid state to liquid state and thence to solid integral final state by chemical condensation.

3. A bushing comprising a body of hard, brittle material having a concave bearing surface and a resilient jacket made of organic material of the type which has the characteristic that under heat and pressure it passes from an initial loose solid state to liquid state and thence to solid integral final state by chemical condensation, said resilient jacket enclosing said body constrictively on all sides except its said concave bearing surface.

4. A bearing comprising a body of brittle material having a substantially smooth bearing surface, and, combined therewith, a co-operating body of tenacious material having a complementary bearing surface, and a stretched elastic solid of organic nature, enclosing the brittle body and having its contiguous points in an equality of intimacy of contact therewith of the type of intimacy which characterizes the contacts, upon a body, of a liquid, under pressure; said elastic solid being arranged exteriorly compressing the brittle material toward the said bearing surfaces.

EDWARD J. OVINGTON.